United States Patent [19]
Labus

[11] 3,945,777
[45] Mar. 23, 1976

[54] BEARING AND BEARING SUPPORT FOR ROTARY PISTON ENGINE FOR COMPRESSING AND EXPANDING GASES

[75] Inventor: Herwig Labus, Julich, Germany

[73] Assignee: Kernforschungsanlage Julich Gesellschaft mit beschrankter Haftung, Julich, Germany

[22] Filed: Dec. 19, 1974

[21] Appl. No.: 534,417

[30] Foreign Application Priority Data
Dec. 19, 1973 Germany............................ 2363066

[52] U.S. Cl. .................. 418/188; 418/206; 308/26; 308/207 A
[51] Int. Cl.² .................... F04C 17/10; F16C 13/06
[58] Field of Search.................. 418/188, 201, 206; 308/189 R, 189 A, 207 A, 26,

[56] References Cited
UNITED STATES PATENTS

| | | | |
|---|---|---|---|
| 1,097,430 | 5/1914 | Heckman........................ | 308/189 A |
| 1,156,188 | 10/1915 | Sörensen......................... | 308/189 R |
| 1,452,603 | 4/1923 | Himes............................. | 308/189 A |
| 2,225,908 | 12/1940 | Garthe............................ | 418/206 |
| 2,724,340 | 11/1955 | Tryhorn......................... | 418/206 X |

FOREIGN PATENTS OR APPLICATIONS

| | | | |
|---|---|---|---|
| 900,881 | 7/1962 | United Kingdom................. | 418/206 |

*Primary Examiner*—C. J. Husar
*Assistant Examiner*—Leonard E. Smith
*Attorney, Agent, or Firm*—Walter Becker

[57] ABSTRACT

A rotary piston engine for compressing or expanding gases, which comprises a housing formed of two cylindrical semi-cups of two equal size cylindrical hollow bodies, said cups facing each other along longitudinal openings. In the housing there are provided two shafts of equal pitch diameter which shafts are rotatable about the central axis of one of two hollow bodies and mesh with a fine-toothed labyrinth with each other. Between each one of the shafts and the inner surface of the hollow body surrounding the pertaining shaft there is formed a working chamber intended for an adiabatic inner compression or expansion of the gases. The shafts respectively comprise a rotary piston extending over the length of the hollow body and extending with slight play to the inner wall of the hollow body and forming with the respective engaging parts of the inner wall of the hollow body a surface forming a gap seal or labyrinth gap seal. The shafts also have a recess adjacent the rotary piston and extend in an axis-parallel manner while the recess has a dimension making possible the meshing of the rotary piston of the other shaft, the two shafts being connected to two control gears which are rotatable about the central axis of said shafts outside the housing and mesh with each other. One of the shafts forms a hollow shaft while the recess in the hollow shaft has such a depth that in this hollow shaft a slot parallel to the axis of the shaft is formed and that the hollow shaft is rotatable about a hollow inner cylinder slit open over the length of the slot. The inner cylinder serves as outlet or inlet conduit while an opening in the housing correspondingly serves as inlet or outlet opening for the gases, and parts such as parts of the housing or of the shafts which have different temperatures and engage each other and are mechanically firmly connected to each other and are rotation symmetric about a common axis are separated from each other by an air gap provided on the conical surface of a cone with the axis of the cone located in the common axis of the parts to be interconnected. In the air gap there are provided connecting bodies of a material which is a poor heat conductor and will withstand high mechanical and thermal stresses. Such material may be quartz glass or porcelain or the like. The connecting bodies are so provided on those sides of the parts to be interconnected which face the air gap that in response to a heat expansion of the hotter part of the parts to be interconnected, the colder part is, due to a spring force, anchored in the two parts to be interconnected displaced in the direction of the common axis.

6 Claims, 2 Drawing Figures

BEARING AND BEARING SUPPORT FOR ROTARY PISTON ENGINE FOR COMPRESSING AND EXPANDING GASES

The present invention relates to a rotary piston engine for compressing or expanding gases, which engine comprises a housing formed of two cylindrical semi-cups of two equal sized cylindrical hollow bodies, said cups facing each other along longitudinal openings. In said housing there are provided two shafts of equal pitch diameter, which shafts are rotatable about the central axis of one of the two hollow bodies and mesh with a fine-toothed labyrinth with each other. Between each one of the shafts and the inner surface of the hollow body surrounding the pertaining shaft there is formed a working chamber intended for an adiabatic inner compression or expansion of the gases. The said shafts respectively comprise a rotary piston extending over the length of the hollow body and extending with slight play to the inner wall of the hollow body and forming with the respective engaging parts of the inner wall of the hollow body a surface forming a gap seal or a labyrinth gap seal. The said shafts also have a recess adjacent said rotary piston and extending in an axis-parallel manner while said recess has a dimension making possible the meshing of the rotary piston of the other shaft, while the two shafts are connected to two control gears which are rotatable about the central axis of said shafts outside the housing and mesh with each other.

Engines for compressing or expanding gases are frequently used in industry. Compression engines are employed as ventilators, blowers, or as compressors.

According to a non-published suggestion, with a rotary piston engine of the above mentioned type with contact-free sealing gaps, one of the shafts is designed as hollow shaft while the recess of the shaft designed as hollow shaft has such a depth that in that shaft which is designed as hollow shaft a slot is formed which extends parallel to the axis of the shaft, and while the shaft designed as hollow shaft is rotatable about an inner hollow cylinder slit open over the length of said slot. The inner cylinder serves as discharge or outlet conduit, and the opening in the housing correspondingly serves as intake or outlet opening for the gases. This rotary piston engine is, according to this suggestion, employed as a compression and/or expansion engine in an internal combustion engine operated as a hot air engine in which one or more compression engines and a combustion chamber operable by burnable substances under continuous and under constant pressure has a volume with a sufficient size for a longer stay of the burnable substances. Furthermore, there are provided one or more expansion engines which follow the combustion chamber but are spatially separated from each other and are connected to each other by connecting lines. Between the compression engine or engines and the combustion chamber there is provided a heat exchanger which is passed through by the gases to be compressed in the compression engine or engines and in counterflow to the compressed gases is passed through by the exhaust gases of the expansion engine or engines. The rotary piston engine is expediently operated with a rotary speed within the range of from 6,000 to 24,000 revolutions per minute and at a compression or expansion with a pressure ratio of the gases of from 2.0 to 5.0.

With the rotary piston engine according to the above mentioned suggestion, for purposes of establishing a heat insulating connection, discs and rings are provided between hot and cooled parts, which rings are made of materials which are poor heat conductors. However, this arrangement has the drawback that the centering of the parts relative to each other which is of importance, for instance, for maintaining a constant gap width between the rotary piston and the inner surface of the respective semi-cup, can be assured only at high expenses.

It is, therefore, an object of the invention to provide a rotary piston engine for compressing and expanding gases, in which the hot and cooled parts of the engine which are adjacent to each other are separated from each other in a heat insulating manner, while however, at the same time being connected to each assured. mechanically in a simple manner so that also at high working temperatures of the rotary piston engine a frictional connection and simultaneously a centering of the parts will be assumed. In this connection, at the same time a heat expansion of the hot parts should be possible without tension or stresses occurring between individual parts of the engine.

These and other objects and advantages of the invention will appear more clearly from the following specification, in connection with the accompanying drawings, in which.

Figure 1:
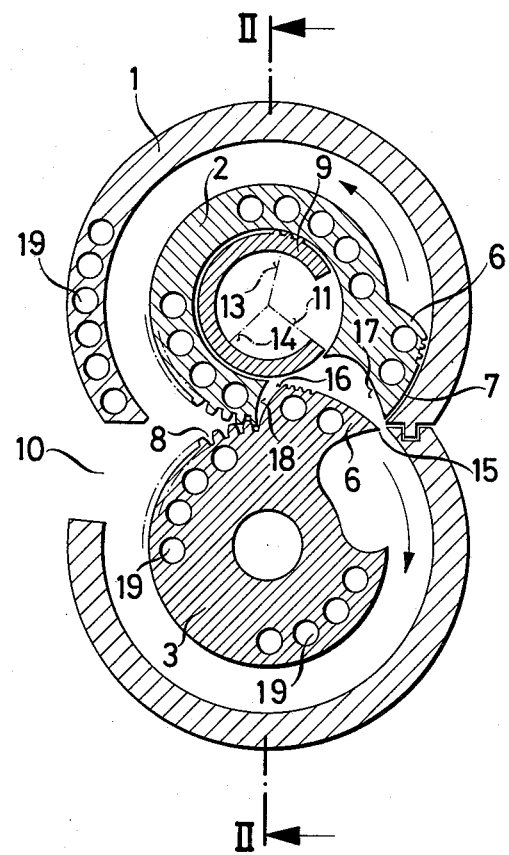
FIG. 1 represents a section taken along the line I—I of FIG. 2.

The rotary piston engine according to the present invention is characterized in that one of the shafts is designed as hollow shaft while the recess of the shaft designed as hollow shaft has such a depth that in the shaft designed as hollow shaft there is formed a slot which is parallel to the axis and that the shaft designed as hollow shaft is rotatable about a hollow inner cylinder slit open over the length of the slot. The inner cylinder serves as outlet or intake conduit, and an opening in the housing correspondingly serves as inlet and outlet opening for the gases. The rotary piston engine according to the present invention is furthermore characterized in that parts, such as parts of the housing or of the shaft which engage each other and which are mechanically to be connected to each other and which are rotatably symmetrical about a common axis while having different temperatures, are separated from each other by an air gap located on the conical surface of a cone with the axis of the cone located in the common axis of the parts to be connected to each other. In the air gap, connecting bodies are provided which are mechanically and thermally strong so as to withstand high load while being poor heat conductors such as quartz glass, porcelain, or the like. These connecting bodies are so arranged on those sides of the parts to be interconnected which face said air gap so that during heat expansion of the hotter part of the parts to be interconnected, the colder part is, due to a spring force is anchored in the two parts displaced in the direction of the common axis.

Due to the air gap which is provided between the hot and cooled parts and which has the width of a few millimeters, a good heat insulation is obtained which is only immaterially affected by the connecting parts. Furthermore, in view of the arrangement of the connecting bodies and also due to the fact that the parts are under a mutual pressure, the cooled part, during the heat expansion of the hot part will be displaced in axial direction in such a way that the frictional engagement between the hot and the cold parts as well as the centering will be maintained at all times. The connecting bodies will at the same time transfer the torque between the parts.

A very advantageous design of the rotary piston according to the present invention consists in that the connecting bodies are designed as hollow cylinders which are embedded in those sides of the interengaging parts which face the air gap and, more specifically, in oppositely located depressions adapted to the form of the hollow cylinders. Inasmuch as only a slight wall thickness of the hollow cylinder is required, the affect of the heat insulation of the air gap is only very slight. In this connection, an advantage of the rotary piston engine according to the invention consists, when employing hollow cylinders as connecting bodies in the simple establishment of the connection between hot and cooled rotatable parts because merely the connecting surfaces of the hollow cylinders with the sides facing the air gap and pertaining to the parts to be connected have to be produced so as to fit. This is realized by first coarsely interconnecting the parts to be connected to each other, for instance, by a separable gluing, or the like, and then by preparing bores along the connecting surface of the two parts into which bores with hollow cylinders are fittingly insertable. Subsequently thereto, those sides of the parts to be interconnected which face each other are by a chip removing machining action treated to such an extent that the provided air gap is formed between the parts.

An expedient design of the rotary engine according to the invention consists in that the rotary pistons and the recesses are so designed that the surfaces of the rotary pistons which, with parts of the inner wall of the hollow bodies, form gap seals or labyrinth gap seals, have a size which corresponds at least to the cross-sectional surface of the foot of the rotary piston, while the rotary pistons and the recesses are so shaped that when the rotary piston of one shaft meshes with the recess of the other shaft, the two surface edges which extend parallel to the central axes of the shaft will with slight play and constant distance be guided along one flank each of the recess of the other shaft. Due to the fact that the surface of the rotary piston which engages the inner wall of the hollow body is as large as possible, it will be realized that also the gap length is as great as possible, whereby a very good seal of the pistons relative to the inner wall of the hollow body is obtained also without oil lubrication. Furthermore, due to the fact that the rotary pistons and the flanks of the recesses are so designed that the surface edges nearly reach the flanks of the recesses at constant distance, the dead chamber volume is kept to a minimum. Due to the external control of the two shafts it is not necessary to maintain a high manufacturing precision. It will suffice if the distance amounts to from 1 to 2 millimeters.

A further expedient embodiment of the rotary piston according to the invention consists in that the shafts are by a factor of from two to three longer than their diameter. As a result thereof, at equal volume of the working chamber, the flow losses of the gases are kept to a minimum, and it will be realized that the centrifugal forces also at high speed of rotation of the shafts are kept within technically permissible limits.

Referring now to the drawings in detail, the rotary piston engine according to the present invention comprises a housing 1, which includes two cylindrical hollow bodies having the shape of cylindrical semi-cups with longitudinal openings along which said cups face each other. Two shafts 2 and 3 with the same pitch diameter are rotatable about the central axis of the cylindrical hollow bodies. As will be evident from FIG. 2, the said shafts 2 and 3 are connected to control gears 37 and 38 which mesh with each other and are rotatably arranged outside the housing 1. Each of the shafts 2 and 3 comprises a rotary piston 6 with a recess thereon, said rotary piston 6 extending over the length of said hollow bodies. That surface of the rotary piston 6 which faces the inner wall of housing 1 forms with the respective adjacent partial surface of the inner wall of housing 1 a gap seal or labyrinth seal 7, as shown in FIG. 1. The two shafts 2 and 3 furthermore comprise a fine-toothed labyrinth 8. As will be evident from FIG. 1, shaft 2 is perforated at its foot and is rotatable about a hollow cylinder 9 which is slit open along the length of the shaft. As will likewise be evident from FIG. 1, the hollow body surrounding shaft 3 is at the defining surface of two hollow bodies provided with an opening 10 which, when the engine operates as expansion engine, works as discharging opening, and when the engine works as compression engine operates as inlet opening for the gases.

FIG. 1 shows the two rotary pistons 6 in their position at the inlet angle 11 in which the pistons define the minimum dead chamber. In the direction of rotation of shafts 2 and 3, as indicated by the arrows, the engine is employed as expansion engine. The gases passing from the combustion chamber 12 (partially illustrated in FIG. 2) into the hollow inner cylinder 9 pass during the further rotation of shafts 2 and 3, due to the fact that the slot in the hollow shaft 2 overlaps the slot in the inner cylinder 9, in an isobaric manner into the working chamber being formed until after a further rotation of the shafts 2 and 3 and after reaching the filling angle 13, the inflow of the gases into the working chamber is interrupted. The gas in the working chamber now has the pressure and temperature of the combustion chamber. During a further rotation of shafts 2 and 3, the gas in the working chamber is adiabatically expanded until the outlet angle 14 has been reached. From this point on, the rotary pistons 6 mesh in a force-free manner up to the starting point at the inlet angle 11. During the next following revolution, the expanded gas is exhausted from the outlet opening 10. Simultaneously, the gas begins anew to flow from the inner cylinder 9 into the working chamber being formed.

When employing the engine as compression engine, the shafts 2 and 3 are rotated in a direction counter to the direction indicated by the arrows in FIG. 1. The gases then enter through the inlet opening 10, are compressed in the working chamber which is being reduced by rotation of shafts 2 and 3, and, as soon as the perforated foot of the recess in shaft 2 overlaps the slot of the inner cylinder 9, pass into the inner chamber of the inner cylinder 9 from where they pass into the combustion chamber.

As will furthermore be evident from FIG. 1, the rotary pistons are so designed that those surfaces of the rotary piston 6 which form the gap seal are as large as possible. The flanks of the tooth spaces are so shaped that as is indicated, for instance, in FIG. 2 with regard to the lower rotary piston 6, during the meshing of the rotary piston 6, the surface edge 15 passes by the flank 17 of the recess in shaft 2, whereas the surface edge 16 passes by the flank 18 of the recess of shaft 2 at constant distance.

In order to assure assume housing 1 as well as shafts 2 and 3 assme the mean discharge gas temperature as soon as possible, and in order to reduce the weight of the engine, bores 19 are provided. These bores are at the same time so arranged in shafts 2 and 3 that the unbalances caused by the rotary pistons 6 and the recesses will be compensated for.

Figure 2:
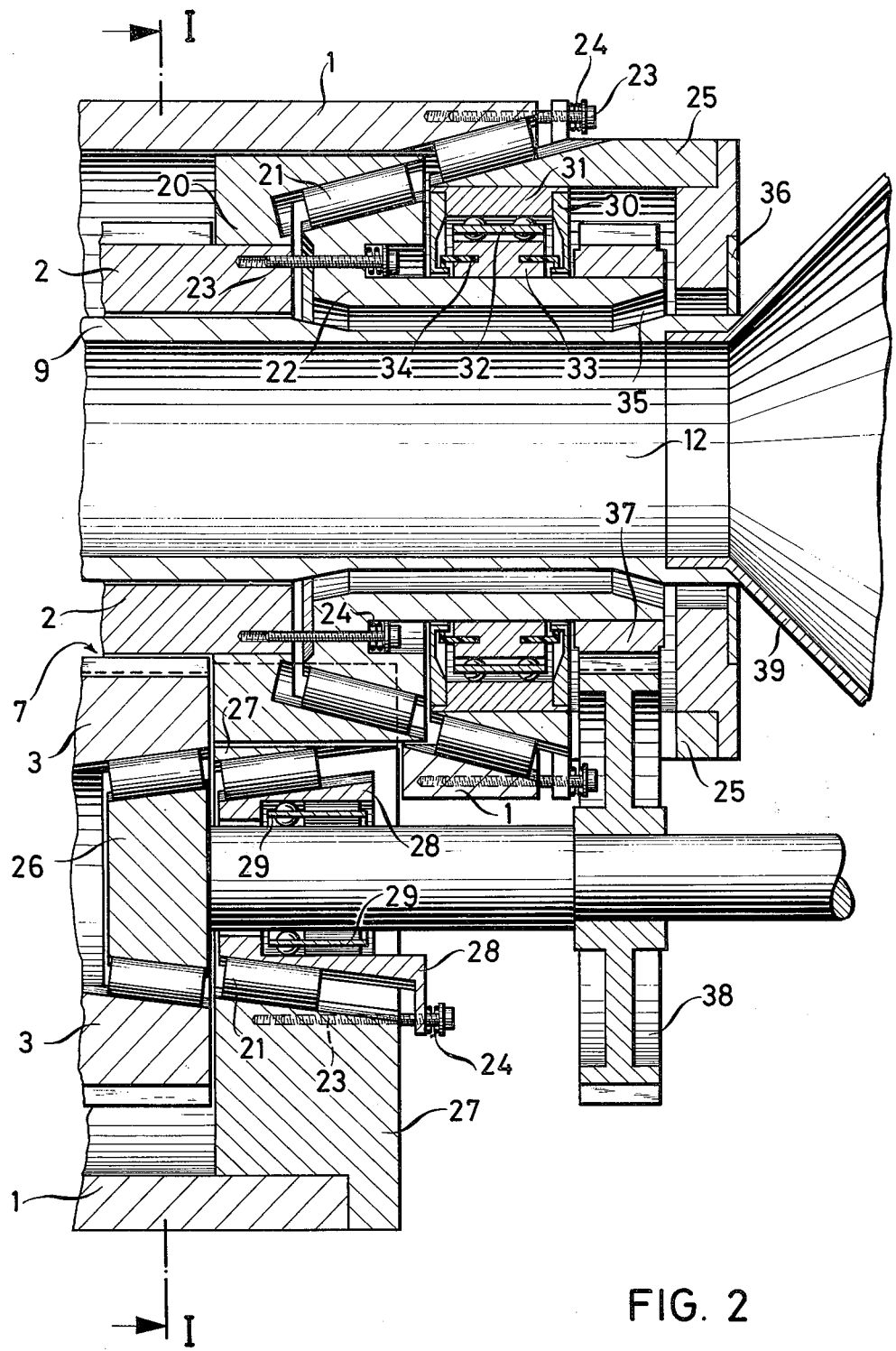
FIG. 2 is a section taken along the line II—II of FIG. 1.

As will be evident from FIG. 2, the hollow shaft 2 rotatable about the inner cylinder 9 has a confining ring 20 having firmly connected thereto, a bearing pivot 22 through the intervention of connectng bodies 21 forming hollow cylinders. Bearing pivots 22 and shaft 2 are, through a screw connection 23, elastically pull-connected to a spring body 24. In the same manner, the housing 1 is fixedly connected to the bearing box 25 for shaft 2 and there is connection to the bearing pivot 28 for shaft 3 through connecting bodies 21 designed as hollow cylinders. As bearings for mounting the shaft 3, there is provided a combined inclined ball-roller bearing 29, and for journaling hollow shaft 2 there is provided a bearing provided with a cover 30 and comprising an outer ring 31, a cage 32, an inner ring 33, and a sealing ring 34.

As will furthermore be evident from FIG. 2, the inner cylinder 9 for purposes of radially positioning is at the level of the bearing for shaft 2 provided with an air chamber 35 which expediently for avoiding convection is filled with suitable insulating material, such as Triton-Kaowool. The inner cylinder 9 is additionally positioned in radial direction by means of a guiding ring 36. As will also be evident from FIG. 2, the two shafts 2 and 3 are, by means of control gears 37 and 38, which have inclined teeth, coupled to each other. The rotary piston engine according to the invention has, as is only partially shown in the drawings, a cylindrical design. Depending on the intended employment of the engine as compression or as expansion engine, the inner cylinder 9 is connected through a connecting part 39 to the heat exchanger or to the combustion chamber.

It is, of course, to be understood that the present invention is, by no means, limited to the specific showing in the drawings, but also comprises any modifications within the scope of the appended claims.

I claim:

1. A rotary piston engine for compressing or expanding gases and comprising; intersecting partial cups on parallel adjacent axes forming a housing, said cups being open near one region of intersection thereof, a rotary piston in each cup, said pistons having meshing labyrinth seal means and each having a radical projection which runs closely inside the pertaining cup, each piston having a pocket to receive the projection on the other piston, said projections being in side by side relation when disposed in said pockets, a hollow shaft coaxial with one piston and opening outside the housing at one end and having an axial slot, the pocket in said one piston having a port which communicates with said slot in one rotated position of said one piston, means for driving the pistons in rotation in unison in respective directions, bearings journaling said pistons in said housing and supports for said bearings, and means interposed between each said support and at least one of the respective said piston and housing for relieving stresses due to thermal expansion and contraction, said means comprising opposed spaced parallel surfaces on said support and said one of said pistons and housing, said surfaces being annular segments of parallel cones on the axis of relative rotation of the respective piston and the housing, and connecting bodies interposed between and engaged by said surfaces, said supports including at least one support for each bearing connected to one of said housing and respective piston for resilient axial movement.

2. A rotary piston engine according to claim 1 which includes a support between each bearing and each of said housing and the respective piston, and axially resilient means nonrotatively connecting each support to the pertaining one of said housing and the respective piston.

3. A rotary piston engine according to claim 1 in which each surface is formed with recesses parallel to the said axis, said recesses in each surface being in opposed relation to those in the other surface, and said connecting bodies comprising hollow cylinders seated in said opposed recesses.

4. A rotary piston engine according to claim 1 in which each piston has labyrinth seal means formed thereon and extending the full axial length of the respective piston.

5. A rotary piston engine according to claim 1 in which at least one of said projections has radially outer leading and trailing edges parallel to the axis of rotation of the pistons, at least one of said edges passing closely along an end wall of the pocket in the other piston as the pistons rotate and said projection moves into and out of said pocket.

6. A rotary piston engine according to claim 1 in which each piston has a length of from two to three times the diameter thereof.

* * * * *